Oct. 25, 1938. M. C. COSNER 2,134,299
AUTOMATIC MOTOR VEHICLE SIGNALING DEVICE
Filed May 24, 1937
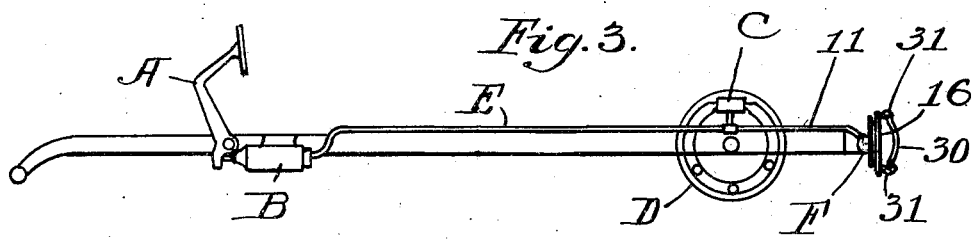
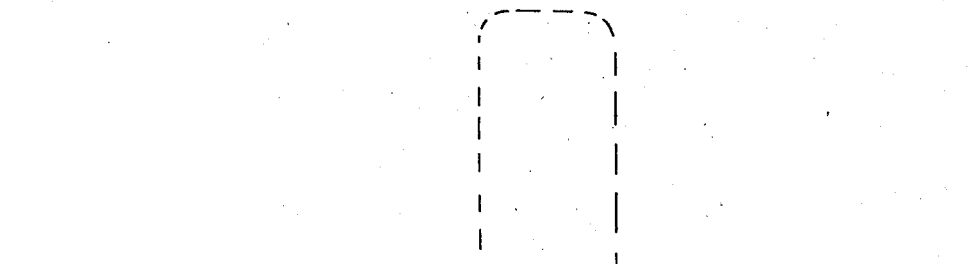
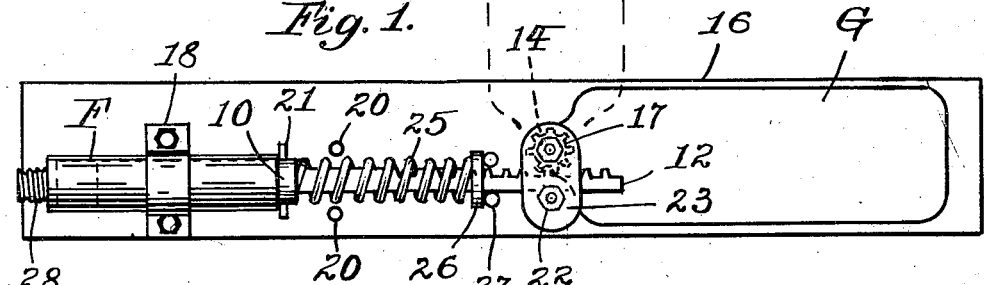
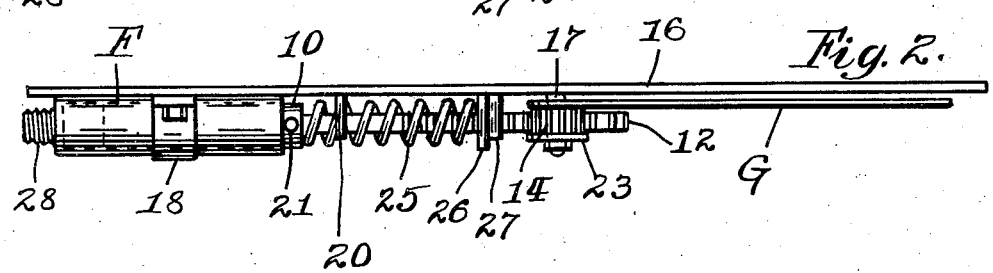
INVENTOR.
Maurice C. Cosner
BY
ATTORNEY.

Patented Oct. 25, 1938

2,134,299

UNITED STATES PATENT OFFICE 2,134,299

AUTOMATIC MOTOR VEHICLE SIGNALING DEVICE

Maurice C. Cosner, Lynwood, Calif.

Application May 24, 1937, Serial No. 144,348

2 Claims. (Cl. 116—39)

My invention relates to improvements in signaling devices for automobiles and more particularly to that type which is particularly adapted for use on the rear end of a vehicle for giving warning to any one approaching from the rear of intended stopping, and to that type in which the signal is actuated automatically when the foot pedal is depressed to apply the brakes. More particularly this invention provides a signal on the rear end of a vehicle which is connected with the hydraulic actuating means for applying the brakes of the vehicle whereby when the foot pedal is depressed the liquid brake actuating medium causes the stop signal to automatically move into signaling position and when the foot pedal is released and the brakes moved into unapplied position the signal returns automatically to non-signaling position. The primary object is to provide a signal means of the type stated which is simple in construction, efficient in operation and not subject to disorder under normal conditions. Among further objects is to provide a signaling device which can be secured to the inner surface of a bumper so that when its signal element is in normal position it is obscured from view and protected by the bumper against injury and when moved into signaling position it is moved into full view from the rear.

In the accompanying drawing forming part of this specification, Fig. 1 is an elevation of my improved signal device showing its semaphore signaling arm in normal unapplied position and in broken lines when applied to signal position; Fig. 2 is a plan of the structure shown in Fig. 1, and Fig. 3 is a diagrammatic view showing my invention mounted upon a rear bumper of a vehicle structure and connected with the hydraulic brake system thereof so as to be operated automatically by the application of the hydraulic brakes.

My improved signal device is adapted for use in conjunction with the hydraulic brake system of a vehicle in which pressure applied to the brake foot pedal A, (see Fig. 1) forces a piston toward a valve seat in a main cylinder B, thus creating hydraulic pressure which causes the pistons in the cylinders such as C of the hydraulic brakes such as D to apply the brake shoes against the steel drums, all of usual construction. When the foot pedal is released the force of the usual brake shoe springs releases the brakes. It will be understood that the main cylinder B is connected with the wheel cylinder C in the usual manner by the pipe line E, the latter being adapted to convey motive liquid to all of the wheel brake cylinders used on the vehicle. My improved signal device has a hydraulic actuating cylinder F, which contains an actuating piston 10, (see Fig. 2), said cylinder F being connected by a duct 11 with said pipe line E to transmit propelling liquid to the signal cylinder and cause its piston to function automatically with the hydraulic brakes of the vehicle.

The signal actuating piston 10 projects from the end of the cylinder F and is provided with a piston rod 12 in the form of a rack having teeth which mesh with the teeth of a pinion 14 so that the reciprocating motion of the rack is converted into the rotary motion of the pinion. A horizontal support 16, resembling a plate is provided, upon which the pinion is journaled by a pinion shaft 17 and the cylinder F is rigidly secured by a clip 18. The pinion 14 carries a signal arm G which normally, in the unapplied position of the brakes, assumes horizontal concealed position back of the support 16. The rack 12 is adapted to reciprocate horizontally and in the application of the brakes revolves the pinion 14 and swings the signal arm into raised and exposed position. The outward thrust movement of the rack when the signal assumes exposed position is limited by a pin 21 on the piston striking the rigid stop pins 20 on the supporting plate 16. The return movement of the rack when the signal arm assumes normal non-signaling and concealed position is limited by said pin 21 impinging against the end of cylinder F. The back of the outer end of the rack 12 slides upon pin 22 which acts as a guide to hold the rack in mesh with the teeth of the pinion and a clip 23 secured to the pinion shaft 17 and pin 22 assists in guiding the rack horizontally. The return movement of the rack and signal arm to normal position is produced by a coil expansion spring 25 enveloping the rack and held endwise by the outer exposed portion of the piston 10 and a collar 26 freely threaded over the rack and abutting against the pair of stop pins 27 which are mounted rigidly upon the supporting plate 16 on both sides of the rack. A screw threaded applicator 28 on the outer end of the signal cylinder F is provided by which the actuating duct 11 can be coupled.

In use my improved signal device is attached to the inner surface of the rear bumper 30 of a vehicle (see Fig. 3) in which position it is protected from injury and its signal arm concealed and protected from the rear. As shown the supporting and protecting plate is mounted by clips 31 on the rear bumper 30 of any suitable construction. When the foot pedal A is depressed the brakes are applied by their wheel cylinders through the hydraulic pressure produced by the motive fluid in main cylinder B. Simultaneously this hydraulic pressure is transmitted to the signal cylinder F wherein its piston 10 reciprocates its rack into forward position and causes the signal arm to swing up above the bumper into exposed signaling position, thus indicating a warning to any one approaching from the rear. The act of releasing the foot pedal releases the motive fluid and the signal spring 25 returns the stop signal G and actuating piston 10 to normal position.

In accordance with the patent statutes, I have described the principles of operation of my invention together with the construction thereof which I now consider to represent the best embodiment thereof but I desire to have it understood that the construction shown is only illustrative and that the invention can be carried out by other means and applied to uses other than those above set forth.

I claim:

1. In combination with a motor vehicle having a hydraulic brake, a pipe line for supplying motive liquid to operate said brake and a bumper on one of its ends, a signal support secured in protected position on the inner surface of said bumper, a signal cylinder mounted upon said support and connected with said pipe line, a piston in said cylinder adapted to be actuated by the motive liquid in said pipe line, a signal arm pivoted on and normally concealed and protected by said support, a pinion connected with said arm and pivoted to revolve about said pivot support, a rack connected and adapted to reciprocate with said piston having teeth in mesh with said toothed pinion whereby said arm is adapted to be revolved into and out of exposed position by the reciprocation of said piston, and a retractile spring for returning the piston to non-signaling position when the hydraulic brake is released by the motive liquid.

2. In combination with a motor vehicle having a hydraulic brake, a pipe line for supplying motive liquid to operate said brake, means for actuating said liquid in said pipe line and a bumper at the rear end of the vehicle, a signal support secured to the inner face of said bumper in concealed position from the rear of said vehicle, a signal cylinder mounted upon said support and connected with said pipe line, a piston in said cylinder adapted to be actuated by the motive liquid in said pipe line, a signal arm normally concealed from the rear of the vehicle by and pivoted upon said support, a pinion connected with said arm and pivoted to revolve about said pivot support, a rack in reciprocable connection with said piston having teeth in mesh with said toothed pinion whereby said arm is adapted to be revolved into exposed position by the reciprocation of said piston, and a retractile spring for returning the piston to normal position and thereby swinging said arm into concealed position when the hydraulic brake is released by the motive liquid.

MAURICE C. COSNER.